(12) United States Patent
Vanoverberghe et al.

(10) Patent No.: US 8,387,021 B2
(45) Date of Patent: Feb. 26, 2013

(54) SYMBOLIC RUNTIME CHECKING OF QUANTIFIED CONTRACTS

(75) Inventors: Dries Vanoverberghe, Redmond, WA (US); Nikolai Tillmann, Redmond, WA (US); Jonathan Paul de Halleux, Seattle, WA (US); Nikolaj S Bjorner, Woodinville, WA (US); Wolfram Schulte, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 12/239,526

(22) Filed: Sep. 26, 2008

(65) Prior Publication Data

US 2010/0083233 A1  Apr. 1, 2010

(51) Int. Cl.
*G06F 9/44* (2006.01)
(52) U.S. Cl. ........................................ 717/126
(58) Field of Classification Search .................. 717/126
See application file for complete search history.

(56) References Cited

U.S. PATENT DOCUMENTS

| | | | | |
|---|---|---|---|---|
| 5,706,406 | A * | 1/1998 | Pollock | 706/51 |
| 5,784,553 | A | 7/1998 | Kolawa et al. | |
| 6,343,376 | B1 * | 1/2002 | Saxe et al. | 717/154 |
| 7,266,808 | B2 | 9/2007 | Kolawa et al. | |
| 2007/0033443 | A1 | 2/2007 | Tillmann et al. | |
| 2007/0033576 | A1 | 2/2007 | Tillmann et al. | |
| 2007/0157169 | A1 | 7/2007 | Chen et al. | |
| 2007/0179920 | A1 * | 8/2007 | Zhang | 706/19 |
| 2008/0082968 | A1 | 4/2008 | Chang et al. | |
| 2008/0082969 | A1 | 4/2008 | Agha et al. | |
| 2009/0164501 | A1 * | 6/2009 | de Moura et al. | 707/102 |
| 2009/0328015 | A1 * | 12/2009 | Bjorner et al. | 717/142 |

OTHER PUBLICATIONS

Karen Zee et al., "Runtime Checking for Program Verification Systems", Mar. 2007, pp. 1-3.*
Byron Cook et al., "Accurate Theorem Proving for Program Verification", 2006, pp. 96-114.*
Cormac Flanagan et al., "An Explicating Theorem Prover for Quantified Formulas", Nov. 2004, pp. 1-15.*
Artho, et al, "Combining Test Case Generation and Runtime Verification", retrieved at <<http://ti.arc.nasa.gov/people/pcorina/papers/asm-tcs.pdf>>, Apr. 12, 2004, pp. 1-32.
Zee, et al, "Runtime Checking for Program Verification Systems", retrieved at <<http://www.mit.edu/~kkz/ZeeRV07.pdf>>, Mar. 5, 2007, pp. 1-3.
"A User Manual—Symbolic Execution Debugger", retrieved at <<http://i11www.iti.uni-karlsruhe.de/~key/download/SymbolicDebuggerManual.pdf>>, retrieved May 16, 2008, pp. 129-133, 42-46.

(Continued)

*Primary Examiner* — Wei Zhen
*Assistant Examiner* — Lanny Ung
(74) *Attorney, Agent, or Firm* — Lee & Hayes, PLLC

(57) ABSTRACT

An extension of symbolic execution for programs involving contracts with quantifiers over large and potentially unbounded domains is described. Symbolic execution is used to generate, from a program, concrete test cases that exhibit mismatches between the program code and its contracts with quantifiers. Quantifiers are instantiated using symbolic values encountered during a set of exhibited runs. In this setting, quantifier instantiation is limited to values supplied to or produced by a symbolic execution. Quantifier instantiation is controlled by performing a matching algorithm that uses runtime values of input and program variables in order to guide and limit the set of quantifier instantiations. With a sufficient set of instances, test cases are derived that directly witness limitations of the auxiliary assertions.

16 Claims, 5 Drawing Sheets

OTHER PUBLICATIONS

Cook, et al, "Symbolic Model Checking for Asynchronous Boolean Programs" retrieved at <<ftp://ftp.inf.ethz.ch/pub/publications/tech-reports/4xx/487.pdf>>, 2005, pp. 1-15.

Wang, et al, "A Toolset for Design by Contract for Java", retrieved at <<http://se.cs.depaul.edu/ise/zoom/papers/other/DBC.pdf>>, retrieved May 16, 2008, DePaul University, School of Computer Science, pp. 1-12.

Williams, et al, "Combining Decision Diagrams and SAT Procedures for Efficient Symbolic Model Checking", retrieved at <<http://www.cs.cmu.edu/~emc/papers/Technical%20Reports/Combining%20Decision%20Diagrams%20and%20SAT%20Procedures.pdf>>, retrieved May 16, 2008, pp. 1-15.

* cited by examiner

SYMBOLIC RUNTIME CHECKING OF QUANTIFIED CONTRACTS

BACKGROUND

One of the most challenging problems in deductive program verification is to find inductive program invariants. Typically, program verifiers require inductive invariants in order to establish correctness proofs. However, stand-alone theorem provers have been unable to find such invariants and require additional support from either a person doing the program verification, or additional tools that can extract auxiliary program invariants. Often, auxiliary invariants state properties about a large collection of values. Such statements can be represented compactly using quantifiers.

While quantifiers enable program verifiers, they are only conceptual constructs and are not executable. This is a problem when testing a program, e.g., to quickly detect errors (as opposed to proving a program correct). Checking code contracts with quantifiers efficiently is particularly challenging because test cases should limit themselves to only unfold quantifiers on a limited set of values in order to be effective.

For example, if a contract ensures that an array with 1 million entries be initialized with a fixed value, then a test program may choose to check that the array is indeed initialized with the same value on all entries. However, if a program only touches the array in two entries, it is much more effective to only check the contract on two representative entries that are affected.

Broadly speaking, many modern specification and verification systems such as Spec#, the Java Modeling language (JML) and so forth, use a design-by-contract approach where the specification language is typically an extension of the underlying programming language. The verification of contracts often uses verification condition generation (VCG). The verification conditions are first-order logical formulas whose validity implies the correctness of the program. The formulas are then fed to interactive or automatic theorem provers.

In practice, there are two limitations of the VCG and proving approach. First, most program verification tools do not by themselves produce sufficiently strong contracts. Such contracts need to be crafted or synthesized independently, usually by a human being. Second, if the program verification tool fails to prove the desired properties, then discovering the mismatch between the contracts and the code, or why the contracts were not strong enough, remains a difficult task. In practice, the program verification tools offer limited help.

Most program verification tools employ an automated solver to prove program properties. These solvers must typically be able to handle a combination of domains, such as integers, bit-vectors, arrays, heaps, and data-types, which are often found in programming languages. In addition, most contracts of interest involve functional correctness and the program's heap. These contracts often involve quantifiers, which solvers must reason about.

One type of solvers that combine various theories is known as a Satisfiability Modulo Theories solver or SMT solver. SMT solvers have recently gained substantial attention. To support quantifiers, one technique used in SMT solvers is pattern matching to determine relevant quantifier instantiations. Pattern matching happens inside of the solver on top of the generated verification condition.

When a proof attempt fails, pin-pointing any insufficient annotation within the context of the SMT solver is obscured by the indirection from the program itself. To give good feedback to a developer in such a case, the SMT solver should provide a human-readable counter-example, i.e. a model of the failed proof attempt. However, producing informative models from quantified formulas remains an open research challenge.

SUMMARY

Described herein is an exemplary system and method for finding useful quantifier instantiations based on concrete runtime values of a program. Executable test cases are automatically generated. For example, such system and method can be used on failed proof attempts. The system and method uses dynamic symbolic execution by exploring program code and code contracts with quantifiers. A developer can analyze the test cases with a traditional debugger to determine the cause of any error. The developer may then correct the program or the contracts and repeat the process.

The system and method includes compiling a quantified formula into a non-deterministic program. The resulting non-deterministic program is controlled by selecting certain values as additional input parameters. One of the first steps of the method is to introduce an additional input parameter that decides whether the quantifier holds. When it is assumed that the quantifier holds, several additional steps are used to find quantifier instantiations that may further restrict possible values for the input parameter. When it is assumed that the quantifier does not hold, steps are taken to non-deterministically choose a value for the bound variable of the quantifier such that the quantifier does not hold for this value.

Specifically, the method is performed by partially evaluating the patterns in quantified assumptions by run-time values of non-bound parameters. Maximal partial evaluations are applied to the patterns such that constant folding gets applied to all sub-terms that do not contain the quantified variables.

Further, at run-time, a symbolic state is built based on the symbolic representation of the current state of the program. Each node in the symbolic state is labeled by the concrete run-time value. Next, the sub-terms in the symbolic state are enumerated. The partially evaluated patterns are matched against the enumerated sub-terms. The labels of the concrete run-time values are used to short-circuit or increase the speed of matching.

This Summary is provided to introduce a selection of concepts in a simplified form that are further described below in the Detailed Description. This Summary is not intended to identify essential features of the claimed subject matter, nor is it intended to be used to limit the scope of the claimed subject matter.

BRIEF DESCRIPTION OF THE DRAWINGS

The Detailed Description is set forth and the teachings are described with reference to the accompanying figures.

DETAILED DESCRIPTION

Figure 1:
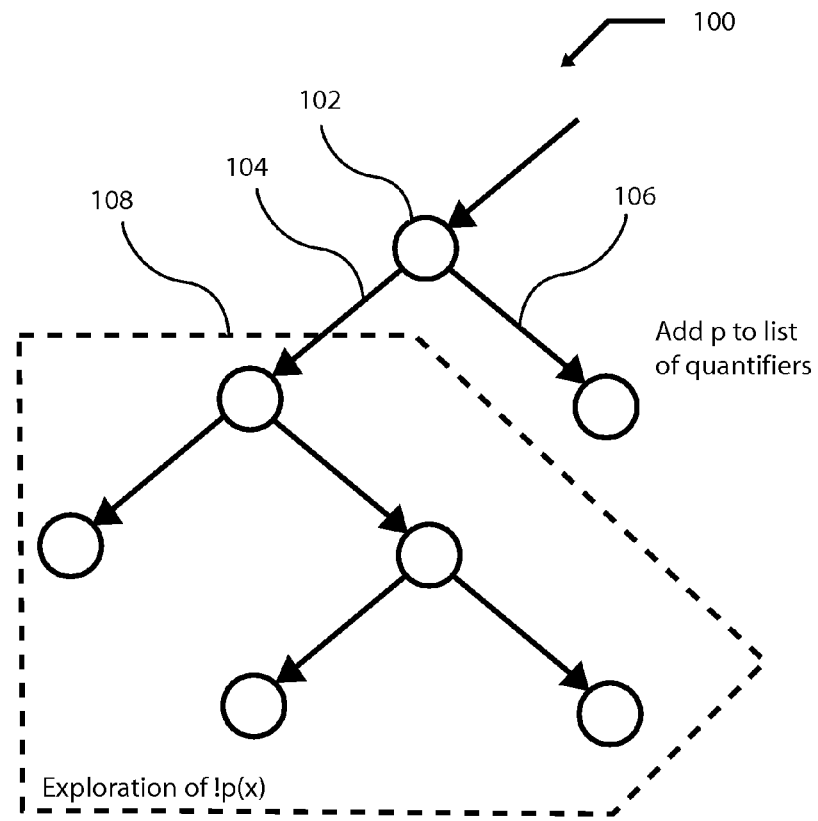
FIG. 1 is a diagram showing an exemplary execution tree for evaluating a quantifier whose branches represent the choices introduced by partially evaluating functions.

Described herein are methods and systems for compiling a quantified formula into a non-deterministic program and finding useful quantifier instantiations based on concrete runtime values of the program.

As an overview, symbolic execution of the program generates test cases that expose errors and help a code developer in debugging problems. Symbolic execution analyzes individual execution traces, where each trace is characterized by a path condition, and finds and describes an equivalence class of test inputs. A path condition can be defined as the conjunction of the guards of all conditional branches that were performed to reach the particular state. A constraint solver is used to decide the feasibility of path conditions, and to obtain concrete test inputs as representatives of individual execution paths. Constraints can also be solved by solvers with model generation capabilities such as SMT solvers. Symbolic execution is also extended to deal with contracts including contracts involving quantifiers over (sufficiently small) finite domains.

More particularly, techniques are disclosed for automatically generating executable test cases from failed proof attempts using dynamic symbolic execution. Quantifiers in contracts are first compiled into a non-deterministic program. The system then non-deterministically guesses the truth-value of the quantified formula. When the guess for a universally quantified formula is true, then the quantifier gets instantiated by selected expressions observed during execution of the non-deterministic program. Quantifier instantiation is controlled by performing a matching algorithm that uses run-time values of input and program variables in order to guide and limit the set of quantifier instantiations. The rest of the Detailed Description presents the specifics of these techniques.

Unit Tests

A unit test is a self-contained program that checks an aspect of the implementation of a program under test. A unit is a part of a program that is testable in isolation. A unit test can be partitioned into three parts. First, a unit test takes exemplary data as test inputs that are passed to the called methods. Second, a unit test consists of a method sequence which represents a typical scenario for the use of an application program interface (API). Third, assertions are used to encode a test oracle of a unit test. The test fails if any assertion fails or an exception is thrown but not caught.

Code Contracts

Code contracts capture programmer intentions about how methods and data should be used, such as method pre-conditions, post-conditions, and object invariants.

In software development, debug assertions are added to programs. A debug assertion is a special instance of a contract. Debug assertions are used for checking various program invariants, such as data-type invariants and relationships between program variables. Typically, debug assertions are checked at run-time only when the software has been compiled in a mode that allows checking of the assertions.

For example, the assertion Assert(n!=null) is used in the code fragment shown in Table 1 to check that the node n is non-null when GetLeftChildAndSetData is called, and the assertion Assert(n→Data==d) checks that the data of n was updated correctly.

TABLE 1

```
class Node { public int Data; public Node Left; public Node Right; };
Node GetLeftChildAndSetData(Node n, int d) {
    Assert(n != null);
    n→Data = d;
    Assert(n→Data == d);
    return n→Left;
}
```

The contract associated with a debug assertion is that every execution of the program must ensure that the predicate in the assertion holds. Contracts can furthermore distinguish between caller and callee conditions. For example, a refined version of the code in Table 1 is shown in Table 2. With reference to Table 2, the function Requires checks for pre-conditions that are established by callers, and the function Ensures checks for post-conditions established by the callee.

TABLE 2

```
Node GetLeftChildAndSetData(Node n, int d) {
    Requires(n != null);
    n→Data = d;
    Ensures(n→Data == d);
    return n→Left;
}
```

In the examples shown in Table 1 and Table 2, the methods shown in Table 3 are assumed:

TABLE 3

```
Void Assert(bool);
void Requires(bool);
void Ensures(bool);
```

Continuing the example, contracts can be used for guiding the generation of useful test-input for the function GetLeftChildAndSetData in isolation. Useful test cases should always satisfy the Requires predicates, and possibly violate one or more of the Ensures predicates to expose bugs.

Thus, test inputs can be found that avoid throwing the RequiresException and attempt throwing the EnsuresException if using a transformation as found in Table 4.

TABLE 4

```
Node GetLeftChildAndSetData(Node n, int d) {
    if (!(n != null)) throw RequiresExeption( );
    n→Data = d;
    if (!(n→Data == d)) throw EnsuresException( );
    return n→Left;
}
```

In this example, if a Requires pre-condition occurs in a nested scope, it would be necessary for the matching call-sites to ensure the pre-conditions; this can be established directly from inspecting the caller's instructions or by using matching Ensures contracts.

Contracts with Quantifiers

Standard debug assertions can be written in the same language as the program where they appear. The same is true for contracts. One advantage of the homogeneous representation is that the assertions and contracts can be statically checked and transformed into executable code by using the same compiler. One drawback is that general contracts may be impractical to execute at run-time. For example, a contract that checks the values of all records in a database or all entries in an array with millions of entries requires significant resources and is impractical to check repeatedly at run-time.

Similarly, it is not practical to generate test-input data for contracts that assert constraints of a very large domain of values.

For example, consider the contract in Table 5.

TABLE 5

Requires(Forall<int>("a[i] == 0",
  i => (!(i >= 0 && i < a.Length) || a[i] == 0)));

As the comment string "a[i]==0" in Table 5 indicates, the contract states that for every integer i that is within the boundaries of an array a, it is the case that a[i]=0. The method Forall and the delegate Predicate<T> are used in this example and are further understood with reference to Table 6 where the signature for Exists<T> checks the existence of a value in T where the predicate holds.

TABLE 6 bool Forall<T>(string comment, Predicate<T> predicate);
public delegate bool Predicate<T>(T obj);
bool Exists<T>(string comment, Predicate<T> predicate);

When the type T is a 64-bit integer, the contract is equivalent to a program that loops over all $2^{64}$ values of T, and checks the predicate. When T ranges over objects, it is infeasible and even less obvious how to enumerate the members of T, whether for test-case generation or runtime checking.
Restricting Quantifier Instances Based on Patterns In first-order theorem proving, there is a known basic mechanism for narrowing down relevant quantifier instances based on patterns. In the pattern-guided quantifier instantiation method, one selects a sub-term or several sub-terms with bound variables in the quantified formula. One only instantiates the quantified variables when the sub-terms match some other term that is present in the current proof-search state.

For example, the quantified contract from Table 5 above is only interesting when the index i is used for accessing the array a. This fact can be captured by annotating the contract with an auxiliary method such as: T Pattern<T>(T value); so that the contract from Table 5 is written as found in Table 7.

TABLE 7

Requires(Forall<int>("a[i] == 0", i => (!(i >= 0 && i < a.Length) ||
  Pattern<int>(a[i]) == 0)));

Note that this transformation does not directly limit the set of values for instantiating the quantifier. There are still an integer i number of possible values to instantiate the quantifier as there are machine representable integers. Operationally, the Pattern method implements the identity function.
Implementing Contracts with Quantifiers Quantifiers within contracts can be realized by non-deterministic methods as follows. In one embodiment, universal quantifiers are used. Since exists{T x; E[x]} is equivalent to !forall{T x; !E[x]}, the same approach can be used for existential quantifiers.

The behavior of a non-deterministic program can be explored by test-case generation techniques. For example, the implementation of Forall<T> is shown in Table 8.

TABLE 8 bool Forall<T>(string comment, Predicate<T> p) {
  bool q_holds = Choose<bool>( );

TABLE 8-continued if (q_holds) {                    // Quantifier holds
    AssumeForall<T>(p);
  } else {                          // Quantifier does not hold.
    T var = Choose<T>( );
    Requires(!p(var));
  }
  return q_holds;
}

The implementation stipulates additional input parameters for q_holds and var. If q_holds is set to true, then the rest of the computation should assume that the quantifier indeed is true on all values. If q_holds is false, then the current state should exhibit a value var where the predicate p is false. And if such an assumption turns out to be wrong, the computation must be discarded.

In implementing Forall<T> the auxiliary methods as found in Table 9 are used.

TABLE 9

T Choose<T>( );            // exposes an additional test input.
void AssumeForall<T>(Predicate<T> p);

The rest of the method includes finding or describing which values the predicate p is evaluated on in order to re-assert the truth of p on all values of T. The effect of AssumeForall<T>(p) so far is that p gets added to a list of quantified predicates during runtime test-case generation.

The behavior of the Forall<T> method is shown in FIG. 1. FIG. 1 shows a tree whose branches represent choices that the program can make, based on test inputs or other non-determinism introduced by the Choose method. The first node with the outgoing branches false and true represents the program branch over q_holds. If q_holds is true, the predicate p is added to the list of quantifiers. If q holds is false, the body of the quantifier p is explored in order to find a value for which the predicate does not hold.

Testing techniques can be used to search for a value such that p_holds is false. Just one value must be found to show that p_holds may be false.

In the subtree where q_holds is true, legal test inputs should satisfy that p holds on all values of type T in the state where the quantifier is encountered. As said before, it is impractical to evaluate p on all values of T, so a method is sought to evaluate p only for values that are relevant in a give execution.

For all relevant values $v_1, \ldots, v_n$, the instantiated quantifier $p(v_i)$ represents a condition that the test inputs must fulfill. In other words, the statement AssumeForall<T>(p); just represents a set of statements such as those found in Table 10 for all relevant values $v_1, \ldots, v_n$.

TABLE 10

Requires(p($v_1$));
Requires(p($v_2$));
...
Requires(p($v_n$));

Conceptually, the program is adapted to contain all Requires(p( . . . )) clauses, once the relevant values are discovered. In a preferred implementation, these additional Requires(p( . . . )) clauses may be checked by a runtime monitoring system once the relevant values are discovered. If p($v_i$) evaluates to false for some value, thent eh execution must be discarded.

Next, it is determined how one can use patterns occurring in the predicate p to restrict the instantiations of predicate p.

Dynamic Symbolic Execution

Dynamic symbolic execution is a variation of conventional static symbolic execution. Dynamic symbolic execution consists in executing the program, starting with arbitrary inputs, while performing a symbolic execution in parallel to collect symbolic constraints on inputs obtained from predicates in branch statements along the execution. Then a constraint solver is used to compute variations of the previous inputs in order to steer future program executions along different execution paths. In this way, all execution paths are eventually exercised.

Table 11 shows one implementation of a general dynamic symbolic execution algorithm. With reference to Table 11, J is the set of already analyzed program inputs. The algorithm stops if no such variable inp can be found in the loop (at the Choose line of execution). Also, the path condition C is recorded since for each i found, C(i) holds.

TABLE 11

```
Set J := false
loop
    Choose program input inp such that ¬J(inp)
    Output inp
    Execute P(inp); record path condition C
    Set J := J ∨ C
end loop
```

One advantage of dynamic symbolic execution over static symbolic execution is that the abstraction of execution paths can leverage observations from concrete executions, and not all operations must be expressed and reasoned about symbolically. Using concrete observations for some values instead of fully symbolic representations leads to an under-approximation of the set of feasible execution paths, which is appropriate for testing. Such cases can be detected, e.g., when a function is called that is defined outside of the scope of the analysis. The tool described herein reports these cases to the user.

Symbolic State Representation

The state of a concrete execution is a mapping from program variables to concrete values, such as 32 or 64-bit integers and heap-allocated (object) pointers. The state of a symbolic execution is a mapping from program variables to terms built over symbolic input values, together with a predicate over symbolic input values, the so-called path condition.

Symbolic and concrete executions are performed in parallel by evolving two separate mappings (a symbolic and a concrete mapping) along a particular sequence of instructions.

The terms symbolically represent computations that are performed. For example, the statement: $u=x*(y+z)$; causes the program variable u to be mapped to the symbolic state $x*(y+z)$, where x, y, and z are input variables. If the inputs for x, y, z are 2, 3, and 4, respectively, the concrete value of u is 14. Terms can be visualized by abstract syntax trees.

Figure 2:
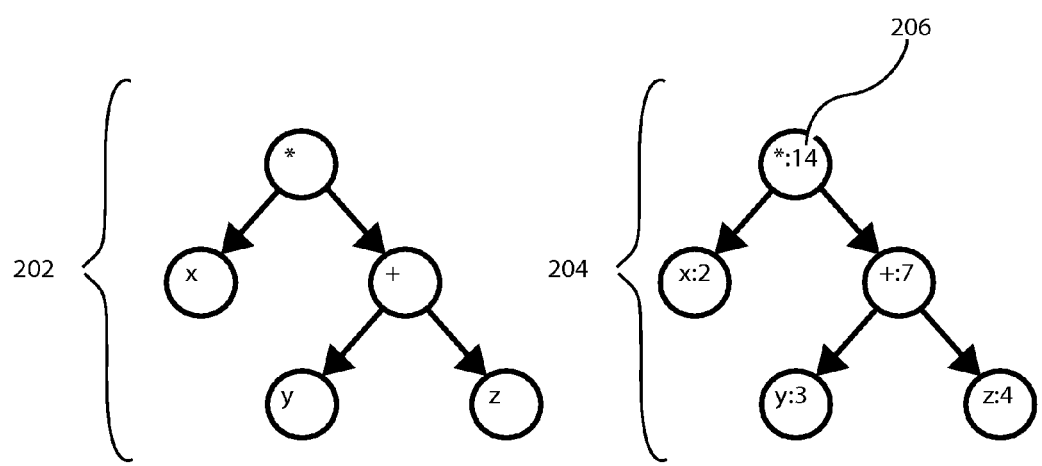
FIG. 2 is a diagram showing a syntax tree for an exemplary function u=x* (y+z) and showing the syntax tree for an exemplary execution where x is 2, y is 3, and z is 4.

FIG. 2 shows two versions of a syntax tree 200. The abstract syntax tree of $x*(y+z)$ is on the left side 202, and the intermediary concrete values corresponding to the nodes in the abstract syntax tree are shown on the right side 204. The syntax tree on the right side 204 represents the partial evaluations of the abstract syntax tree on the left side 202. In the example, since all three run-time values of x, y and z are known, the maximal evaluation of the abstract syntax tree is the number 14 as sown in the top bubble 206 on the right side 204.

Figure 3:
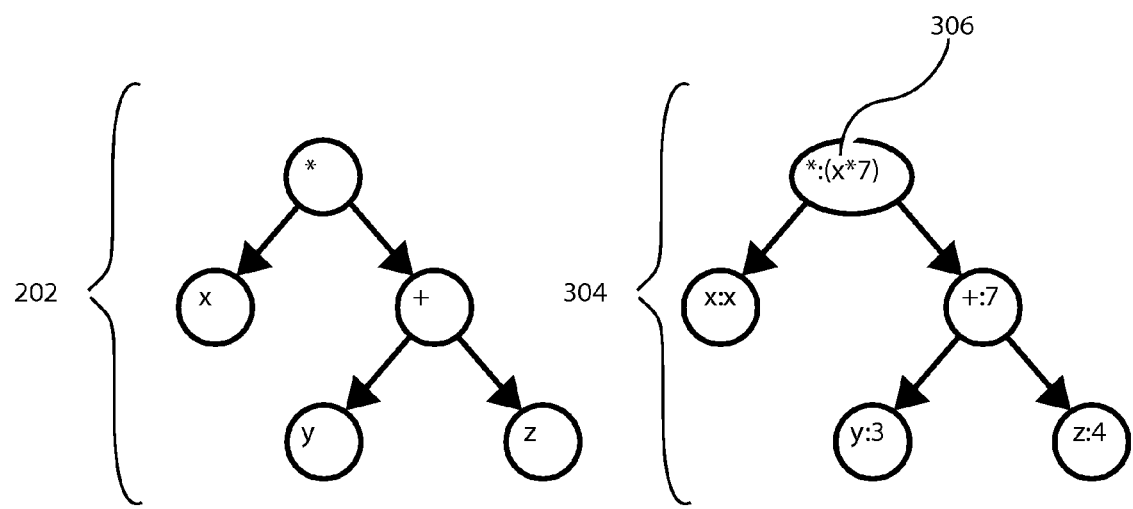
FIG. 3 is a diagram showing a syntax tree for the exemplary function shown in FIG. 2 where the value of x is unknown.

FIG. 3 also shows two version of a syntax tree 300. The abstract syntax tree of $x*(y+z)$ is shown on the left side 202. If, for example, the value of x is not known at run-time, then the maximal evaluation of the tree results in $x*7$ as shown at the top or final operation 306.

The path condition is the conjunction of all the guards of all conditional branches that were performed to reach the state. For example, when the method shown in Table 12 reaches the comment "target", the path condition consists of two conjuncts, (x>0) and (x*x==0). Note that the symbolic state is always expressed in terms of the symbolic input values, that is why the value of the local variable y is expressed in Table 12 with the parameter x.

TABLE 12

```
foo(int x) {
    if (x>0) {
        int y = x*x;
        if (y==0) {
            // target
```

Observed values: The set of terms (abstract syntax trees) built during symbolic execution represent the observed values of the input.

When a new quantifier is added to the list of quantifiers, then at this point in time, all previously derived terms must be considered for quantifier instantiation. Also, all subsequently derived terms must be considered to instantiate the quantifier.

Convention: One implementation of the method described herein restricts quantifier instantiation to observed values. Values that are not observed are discarded or ignored from the point of view of the program under test. The method admits test inputs that violate contracts on unobserved values.

Test Inputs and Non-Deterministic Programs

Dynamic symbolic execution determines a set of concrete test inputs for a program. In practice, parameter values can be determined for a designed top-level function. In addition to the immediate parameter values, dynamic symbolic execution allows the code-under-test to call a generic function Choose in order to obtain an additional test input. For example, the function would have the following signature: T Choose<T>( ); in C# syntax. The function would have a similar, corresponding syntax in another programming language since this implementation may be used with various programming languages.

Each invocation of this function along an execution trace provides the program with a distinct additional symbolic test input.

Runtime-Guided Pattern Matching

The matching filter: the following method describes the steps of the run-time guided pattern matching. First, the method partially evaluates the patterns in quantified assumptions by the run-time values of non-bound parameters. Next, the patterns are maximally partially evaluated, such that constant folding gets applied to all sub-terms that do not contain the quantified variables. Second the method at run-time builds a symbolic state based on the symbolic representation of the current state. Third, each node is labeled in the symbolic state by the concrete run-time value (as illustrated by example in FIG. 2). Fourth, the sub-terms that appear in the symbolic state are enumerated. Fifth, the partially evaluated patterns are matched against the enumerated sub-terms. In this fifth step, the labeling of concrete run-time values is used to short-circuit or speed up the matching. In a preferred implementation, the patterns are maximally partially evaluated.

A match succeeds if the concrete run-time values coincide. On the other hand, the symbolic representations may be different, but the use of run-time values ensures that every match that may be valid at a give execution point is found by using the run-time values. Thus, this process can be used for supplying a superset of useful values for parameters to quantified contracts.

Next, an example of performing this method is described. Consider a pattern of the following form: w*((w+u)+V) where w is an identifier used in a program and V is a pattern variable. Table 13 shows an exemplary program fragment.

TABLE 13

```
y = u + 4;
w = 4;
if (x == y – u) {
    u = x * (y + z);
    ...
```

The pattern w*((w+u)+V) is matched against the term x*((u+4)+z) which is built by expanding the assignment to y by u+4. Matching proceeds by following the structure of the pattern as shown in Table 14.

TABLE 14

```
Match(w * ((w + u) + V), x * ((u + 4) + z) ) =
    Match(w, x) and
    Match(((w + u) + V), ((u + 4) + z) )
```

Since the pattern occurs only under the if-condition (x==y–u) it must be the case that the run-time value of both x and w is 4. So by using the runtime values, the first match reduces to Match(4,4) which holds.

The second call to Match reduces to Match((w+u), (u+4)) and Match(V, z). The first matching obligation can be solved by looking at the runtime values of w and u: Match(8,8). The second matching obligation binds the variable V to z.

To further filter the pattern match against coincidental runtime equal values the quantified predicate may be guarded. For example, p(i) to the following: pattern(i)=t=⇒ p(i) where t is a symbolic term occurring in the state. The guarded predicate can be used in a symbolic constraint solver that finds additional test inputs.

EXAMPLE

The following description is an example of an output according to an exemplary implementation. Consider the method shown in Table 15, which takes two parameters. With reference to Table 15, the test has two pre-conditions and contains one post-condition statement that states the expected result. The quantifier states that the given array should be equal to zero at all indices that lie within the array bounds. The other requirement states that j should be within the array bounds. Under these conditions, the post-condition states that a[j] should be equal to zero.

TABLE 15

```
public void ForallTest2([AssumeNotNull]int[ ] a, int j)
{
    Requires(Forall<int>("a[i] == 0",
        i => !(i >= 0 && i < a.Length)
            || Pattern<int>(a[i]) == 0
    ));
    Requires(j >= 0 && j < a.Length);
    Ensures(a[j] == 0);
}
```

Table 16 shows a testcase for the Foralltest2 function or program snippet shown in Table 15. A correct test input satisfies all pre-conditions including the quantifier. With reference to Table 16, the log shows the pattern of the quantifier and its body as S-expressions, and instantiation of the quantifier with j. These S-expressions show how the C# function shown in Table 15 has been translated to a term. In Table 16, "ite" represents a ternary if-then-else term, "clt" compares if one value is less than another, "ceq" compares whether two values are equal, "len" obtains the length of an array, "select" selects a map at an index, and "choiceof( . . . )" represents a choice made by the program. True is represented by "1", and false by "0".

The test case itself starts by initializing the PexOracle, that is used to control the internal non-determinism of the program. Here, the PexOracles chooses "true" as the value p_holds. An array is created with one element, (whose value is zero by default) and j is set of a value that lies within the bounds of the array.

TABLE 16

```
[–]quantifier:a[i] == 0
[–]pattern
(
    select (
        select $Items a) choiceof(comprehension(0, a[i] == 0), –1, ?var))
[–]body
(
    ite (
        Clt choiceof(comprehension(0, a[i] == 0), –1, ?var) 0) 1 (
        ite (
            Clt choiceof(comprehension(0, a[i] == 0), –1, ?var) (
                len a)) (
                ite (
                    Ceq (
                        select (
                            select $Items a) choiceof(comprehension(0,
                                a[i] == 0), –1, ?var)) 0) 1 0) 1))
[–]instantiations
[–]a[i] == 0
(ite (Clt j 0) 1 (ite (Clt j (len a)) (ite (Ceq (select (select $Items a) j) 0)
1 0) 1))
2008-03-14 14:48:48Z>New test found after 9 runs, 0/0 blocks covered
Test: ForallTest2Int32Int32__20080314__144848_008
IPexOracleRecorder oracle = PexOracle.NewTest( );
((IPexOracleSessionBuilder)(oracle.OnComprehension(0, "a[i] == 0")
    .ChooseAt(0, "truth", (object)true);
int[ ] is0 = new int[1];
((QuantifierDemo)this).ForallTest2(is0, 0);
```

Table 17 shows a case where test inputs are selected which violate the assumption/requires clauses of the test case. The method of the implementation provides the results as part of the analysis, and a user can discard them.

TABLE 17

```
[–]quantifier:a[i] == 0
[–]pattern
(
    select (
        select $Items a) choiceof(comprehension(0, a[i] == 0), –1, ?var))
[–]body
(
    ite (
        Clt choiceof(comprehension(0, a[i] == 0), –1, ?var) 0) 1 (
        ite (
            Clt choiceof(comprehension(0, a[i] == 0), –1, ?var) (
                len a)) (
                ite (
                    Ceq (
                        select (
                            select $Items a) choiceof(comprehension(0,
a[i] == 0), –1, ?var)) 0) 1 0) 1))
```

TABLE 17-continued

```
[-]instantiations
[-]a[i] == 0
(ite (Clt j 0) 1 (ite (Clt j (len a)) (ite (Ceq (select (select $Items a) j) 0)
1 0) 1))
2008-03-14 14:48:48Z>New test found after 10 runs (90.00 % unique
paths), 0/0 blocks covered
Test(10) : ForallTest2Int32Int32__20080314__144848__009 , allowed
PexAssumptionViolationException , duplicatepath
IPexOracleRecorder oracle = PexOracle.NewTest( );
((IPexOracleSessionBuilder)(oracle.OnComprehension(0, "a[i] == 0")
    .IsDone(true)))
    .ChooseAt(0, "truth", (object)true);
int[ ] is0 = new int[1];
is0[0] = 1;
((QuantifierDemo)this).ForallTest2(is0, 0);
Exception not caught by test:
PexAssumptionViolationException: current path does not satisfy
quantifier instantiations
(ThrowerAssembly)
```

The test case itself starts by initializing the PexOracle that is used to control the internal non-determinism of the program. Here, the PexOracle chooses "true" as the value p_holds. As a consequence, the quantifier is used to find instantiations. An array is created with one element, whose value is set to one, and j is set to a value that lies within the bounds of the array.

The quantifier is instantiated by matching the condition a[j] that is part of the post-condition. However, the instantiation does not hold where the instantiation would read as !(>=0 && j<a.Length)||(a[j]==0) in the language C#.

Figure 4:
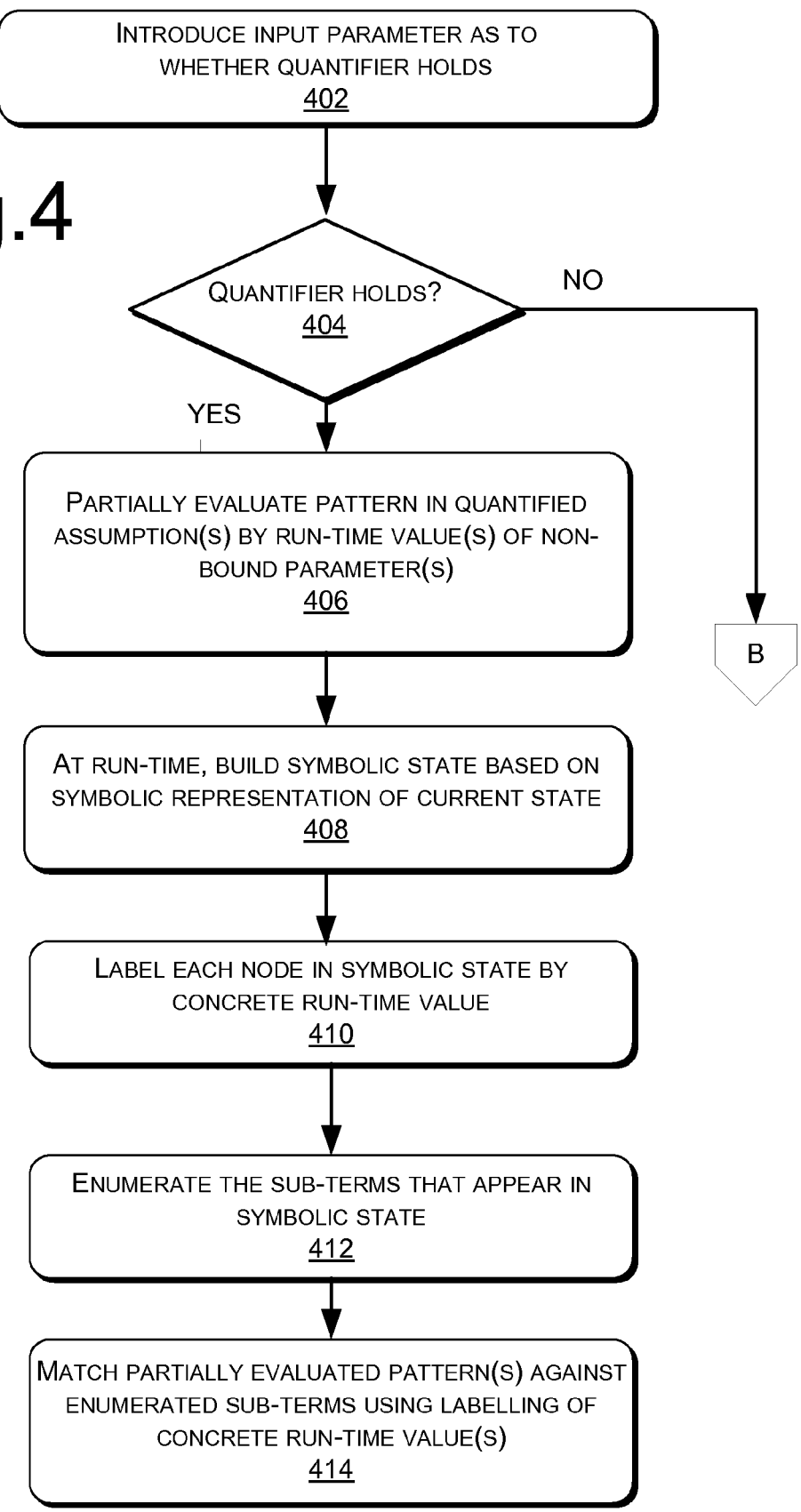
FIG. 4 is a flowchart showing one implementation to find useful quantifier instantiations based on concrete run-time values.
Figure 5:
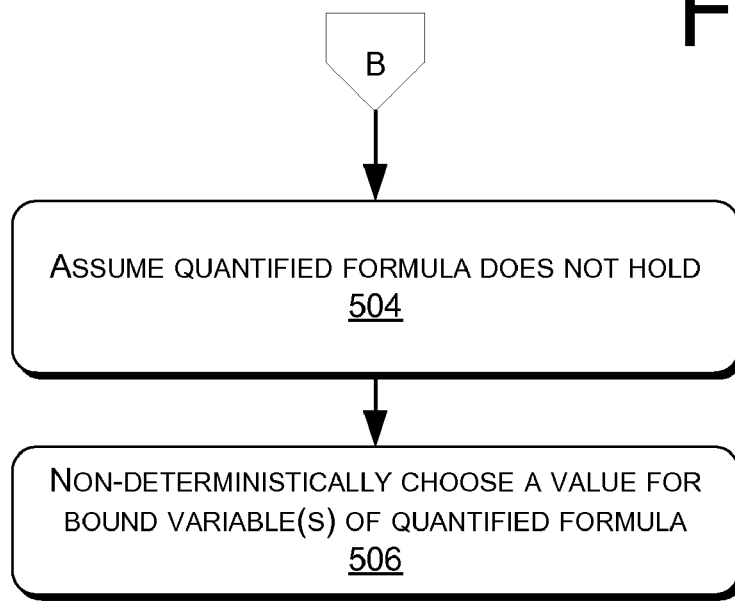
FIG. 5 is a continuation of FIG. 4 where the quantifier does not hold.

FIGS. 4 and 5 summarize one implementation of the method described herein. With reference to FIG. 4, at 402, an input parameter is introduced to see whether a quantifier of a formula or program holds. If the quantifier holds at 404, one or more the patterns are partially evaluated in quantified assumptions by the run-time values of non-bound parameters. Maximal partial evaluation is applied on the patterns such that constant folding gets applied to all sub-terms that do not contain the quantified variables.

Next, at run time (at 408), a symbolic state is built based on a symbolic representation of the current state. At 410, each node in the symbolic state is labeled by the concrete run-time value. At 412, the sub-terms are enumerated, the ones that appear in the symbolic state. Next, at 414, the (maximally) partially evaluated patterns are matched against the enumerated sub-terms. The labeling of the concrete run-time values is used to speed up matching.

In addition, for the case where the quantifier does not hold (at 404), FIG. 5 shows the steps taken. With reference to FIG. 5, at 504, it is assumed that the Quantified formula does not hold. Then, at 506, the method non-deterministically chooses a value for each bound variable in the quantifier such that the Quantified formula does not hold for this value. In this method, other steps may be taken.

While the term quantifier has been used synonymously with quantified formula, it is noted that a quantifier is part of a quantified formula. One can speak of quantifier as either Forall or Exists, but one of skill in the art could understand quantifier to refer to the quantor ("Forall" or "Exists"). It could also refer to the bound variables and pattern. For example, symbolically, it can be written that a Quantified Formula=Quantor+Bound Variables+Patterns+Formula Body. A Quantifier would then be equal to Quantor+Bound Variables+Patterns.

Exemplary Hardware

Figure 6:
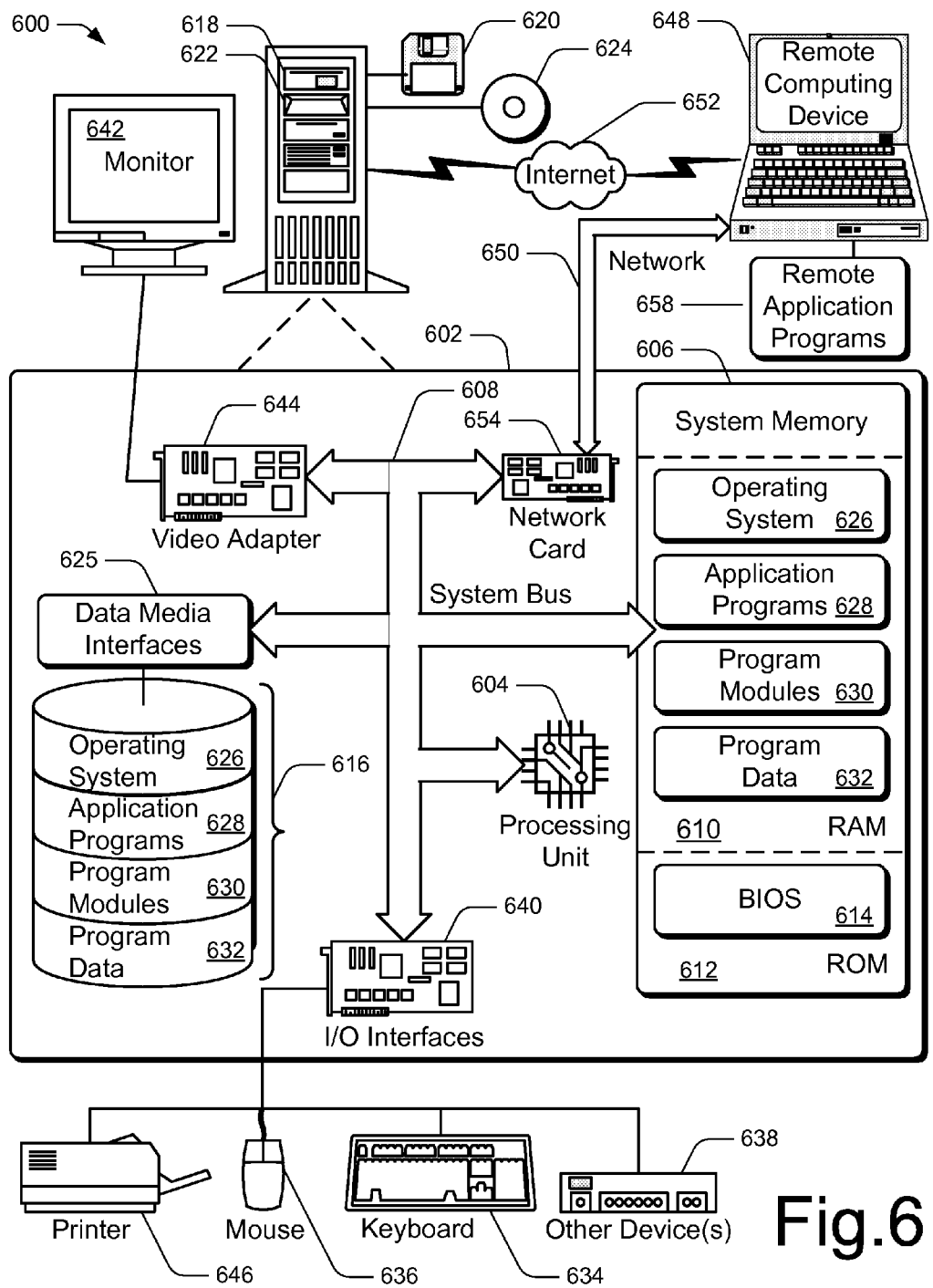
FIG. 6 is a diagram of an exemplary computer system with which the method described herein may be applied.

FIG. 6 shows an example of hardware and related components on which the methods and techniques described herein may be implemented. With reference to FIG. 6, the system bus 608 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures comprise an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

An exemplary computer 602 comprises a variety of computer readable media. Such media can be any available media that is accessible by computer 602 and comprises both volatile and non-volatile media, removable and non-removable media.

The system memory 606 comprises computer readable media in the form of volatile memory, such as random access memory (RAM) 610, non-volatile memory, such as read only memory (ROM) 612, or both. A basic input/output system (BIOS) 614, containing the basic routines that help to transfer information between elements within a computer 602, such as during start-up, is stored in ROM 612. RAM 610 typically contains data, program modules, or both, that are immediately accessible to or processed by the processing unit 604.

Exemplary computer 602 also comprises other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620, and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 625. Alternatively, the hard disk drive 616, magnetic disk drive 618, and optical disk drive 622 can be connected to the system bus 608 by one or more interfaces (not shown).

The disk drives and their associated computer-readable media, or processor-readable media, provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be used to implement the example computing system and environment.

Any number of program modules can be stored on the hard disk 616, magnetic disk 620, optical disk 624, ROM 612, RAM 610, or combination thereof, including by way of example, an operating system 626, one or more application programs 628, program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not specifically shown) comprise a microphone, joystick, game pad, satellite dish, serial port, scanner, and the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices may comprise components such as speakers (not shown) and a printer 646 which can be connected to the computer 602 via input/output interfaces 640.

A computer 602 on which to practice the methods described herein operates in a networked environment using logical connections to one or more remote computers, such as a remote computing device 648. By way of example, the remote computing device 648 can be a personal computer, portable computer, a server, a router, a network computer, a peer device or other common network node, game console, and the like. The remote computing device 648 is illustrated as a portable computer that can include many or all of the elements and features described herein relative to computer 602.

Logical connections between a computer 602 and a remote computer 648 are depicted as a local area network (LAN) 650 and a general wide area network (WAN) 652 or Internet. It is to be understood that a computer 602 and remote computer 648 are connected such that the protocol described herein is enabled. In one embodiment, such connection is a switched fabric communications link used in high-performance computing. Such connection is preferably a point-to-point bidirectional serial link.

When implemented in a SAN networking environment, the computer 602 is connected to a local network 650 via a network interface or system area network (SAN) adapter 654 or SAN-enabled NIC. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

CONCLUSION

In the previous description, the embodiments were described with reference to acts and symbolic representations of operations that are performed by one or more computers, unless indicated otherwise. As such, it is understood that such acts and operations, which are at times referred to as being computer-executed, comprise the manipulation by the processing unit of the computer of data in a structured form. This manipulation transforms the data or maintains it at locations in the memory system of the computer, which reconfigures or otherwise alters the operation of the computer in a manner well understood by those skilled in the art. The data structures, where data is maintained, are physical locations of the memory that have particular properties defined by the format of the data. However, the embodiments are not meant to be limiting as those of skill in the art appreciate that various acts and operation described hereinafter may also be implemented in hardware.

Although the description above uses language that is specific to structural features and methodological acts, it is to be understood that the embodiments defined in the appended claims is not limited to the specific elements, features, modes, or acts described. Rather, the specifics are disclosed as exemplary forms.

In view of the many possible embodiments to which the principles described herein may be applied, it should be recognized that the embodiment described herein with respect to the drawing figures is meant to be illustrative only and should not be taken as limiting. For example, the illustrated embodiment can be modified in arrangement and detail without departing from the spirit of that described herein. Therefore, the description herein contemplates all such embodiments as may come within the scope of the following claims and equivalents thereof.

We claim:

1. In a computing environment comprising at least one processor and at least one computer-readable storage media, a method for compiling a quantified formula into a non-deterministic program and controlling execution of a resulting non-deterministic program, the method comprising:
    providing a quantifier input parameter that decides whether an instance of a quantifier of the quantified formula holds;
    setting the quantifier input parameter to true;
    finding at least one quantifier instantiation that restricts possible values for the input parameter by performing a quantifier instantiation method, the quantifier instantiation method comprising:
        making a quantified assumption for the input parameter, wherein the quantified assumption has at least one pattern;
        partially evaluating the at least one pattern in the quantified assumption by run-time values of non-bound parameters;
        applying a maximal partial evaluation on the pattern to create a maximally partially evaluated pattern such that constant folding is applied to all sub-terms that do not contain any quantified variables; and
        at run-time, building a symbolic state of the program based on a symbolic representation of the current state of the program;
        labeling each node in the symbolic state with a corresponding concrete run-time value;
        enumerating the sub-terms that appear in the symbolic state; and
        matching the maximally partially evaluated pattern against the enumerated sub-terms; and
    setting the quantifier input parameter to false and non-deterministically finding a value for the bound variable of the quantifier such that the quantified formula does not hold for this value.

2. The method of claim 1 wherein the matching the maximally partially evaluated pattern against the enumerated sub-terms further comprises the use of labeled concrete run-time values.

3. The method of claim 1 wherein the resulting non-deterministic program is controlled by selecting values for at least one additional input parameter.

4. The method of claim 1 wherein non-deterministically finding a value for the bound variable of the quantifier such that the quantified formula does not hold comprises performing a second quantifier instantiation method wherein the second quantifier instantiation method comprises:
    making a quantified assumption as to the quantified input parameter where the quantified formula does not hold;
    partially evaluating a pattern in the quantified assumption by using run-time values of non-bound parameters where the quantifier does not hold;
    applying a maximal partial evaluation on the pattern, where the quantified formula does not hold, to create a maximally partially evaluated pattern such that constant folding is applied to all sub-terms that do not contain any quantified variables; and
    at run-time, building a symbolic state of the program, where the quantified formula does not hold, based on a symbolic representation of the current state of the program;
    labeling each node in the symbolic state of the program, where the quantified formula does not hold, with a corresponding concrete run-time value;
    enumerating the sub-terms that appear in the symbolic state of the program where the quantified formula does not hold; and
    matching the maximally partially evaluated pattern against the enumerated sub-terms.

5. The method of claim 1 wherein a quantified predicate of the quantified formula is instantiated by a guarded formula, the guarded formula comprising an instance where terms of the guarded formula match terms of the pattern of the quantified assumption.

6. The method of claim 1 wherein the method further comprises:
    identifying at least one test case when the quantifier input parameter is true; and
    identifying at least one test case when the quantifier input parameter is false.

7. One or more computer-readable storage devices having computer-executable instructions stored thereon that, when executed, direct a computer to perform a method, the method comprising:
    providing a quantifier input parameter that decides whether the quantified formula holds;
    setting the quantifier input parameter to true and finding at least one quantifier instantiation that restricts at least one possible value for the input parameter by performing a quantifier instantiation method, the quantifier instantiation method comprising:
        making a quantified assumption as to the input parameter;
        partially evaluating a pattern in the quantified assumption by run-time values of non-bound parameters;
        applying a maximal partial evaluation on the pattern to create a maximally partially evaluated pattern such that constant folding is applied to all sub-terms that do not contain any quantified variables; and
        at run-time, building a symbolic state of the program based on a symbolic representation of the current state of the program;
        labeling each node in the symbolic state with a corresponding concrete run-time value;
        enumerating the sub-terms that appear in the symbolic state; and
        matching the maximally partially evaluated pattern against the enumerated sub-terms; and
    setting the quantifier input parameter to false and non-deterministically finding a value for the bound variable of the quantifier such that the quantified formula does not hold for this value.

8. The one or more computer-readable storage devices of claim 7 wherein the matching the maximally partially evaluated pattern against the enumerated sub-terms further comprises the use of labeled concrete run-time values.

9. The one or more computer-readable storage devices of claim 7 wherein the resulting non-deterministic program is controlled by selecting values for additional input parameters.

10. The one or more computer-readable storage devices of claim 7 wherein non-deterministically finding a value for the bound variable of the quantifier such that the quantified formula does not hold comprises performing a second quantifier instantiation method wherein the second quantifier instantiation method comprises:
    making a quantified assumption as to the input parameter where the quantifier does not hold;
    partially evaluating a pattern in the quantified assumption by run-time values of non-bound parameters where the quantified formula does not hold;
    applying a maximal partial evaluation on the pattern, where the quantified formula does not hold, to create a maximally partially evaluated pattern such that constant folding is applied to at least one sub-term that does not contain any quantified variables; and
    at run-time, building a symbolic state of the program, where the quantified formula does not hold, based on a symbolic representation of the current state of the program;
    labeling at least one node in the symbolic state of the program, where the quantified formula does not hold, with a corresponding concrete run-time value;
    enumerating at least one sub-term that appear in the symbolic state of the program where the quantified formula does not hold; and
    matching the maximally partially evaluated pattern against the at least one enumerated sub-term.

11. The one or more computer-readable storage devices of claim 7 wherein a quantified predicate of the quantified formula is weakened to find an additional quantifier instantiation.

12. The one or more computer-readable storage devices of claim 7 wherein the method further comprises:
    identifying at least one test case when the quantifier input parameter is true; and
    identifying at least one test case when the quantifier input parameter is false.

13. A system for compiling a quantified formula into a non-deterministic program and controlling execution of a resulting non-deterministic program, the system comprising:
    a processor;
    a non-deterministic program compiler that is configured to provide a quantifier input parameter, set the quantifier input parameter to true, and find at least one quantifier instantiation of the non-deterministic program by performing a method, the method comprising:
        making a quantified assumption for the quantifier input parameter, wherein the quantified assumption has at least one pattern;
        partially evaluating the at least one pattern in the quantified assumption by using run-time values of non-bound parameters;
        applying a maximal partial evaluation on the pattern to create a maximally partially evaluated pattern such that folding is applied to all sub-terms that do not contain any quantified variables; and at run-time, building a symbolic state of the non-deterministic program based on a symbolic representation of the current state of the program;

labeling each node in the symbolic state with a corresponding concrete run-time value; and enumerating at least one sub-term that appears in the symbolic state; and an abstract matching machine in electronic communication with the non-deterministic program compiler, wherein the abstract matching machine is configured to match the maximally partially evaluated pattern in the non-deterministic program against the at least one enumerated sub-term of the symbolic state of the quantified formula.

14. The system of claim 13 wherein the non-deterministic program compiler is further configured to set the quantifier input parameter to false and non-deterministically find a value for the bound variable of the quantifier such that the quantifier does not hold for the value for the bound variable.

15. The system of claim 13 wherein a quantified predicate of the quantified formula is weakened to find at least one additional quantifier instantiation.

16. The system of claim 13 wherein the non-deterministic program compiler is further configured to identify at least one test case when the quantifier input parameter is true and identify at least one test case when the quantifier input parameter is false.

* * * * *